United States Patent
Anjos

(10) Patent No.: US 8,002,145 B2
(45) Date of Patent: Aug. 23, 2011

(54) REUSABLE ASSEMBLY FOR CONTAINING, DISTRIBUTING AND CONSUMING MINERAL WATER

(75) Inventor: Carlos Alberto Rodrigues Anjos, Campinas (BR)

(73) Assignee: Stop Air Locacao de Sistemas de Embalagens de Liquidos Ltda., Jundiaf (BR)

(*) Notice: Subject to any disclaimer, the term of this patent is extended or adjusted under 35 U.S.C. 154(b) by 926 days.

(21) Appl. No.: 11/720,381

(22) PCT Filed: Nov. 25, 2005

(86) PCT No.: PCT/BR2005/000242
§ 371 (c)(1),
(2), (4) Date: May 29, 2007

(87) PCT Pub. No.: WO2006/056034
PCT Pub. Date: Jun. 1, 2006

(65) Prior Publication Data
US 2008/0156827 A1    Jul. 3, 2008

(30) Foreign Application Priority Data
Nov. 29, 2004  (BR) .................................. 0405365

(51) Int. Cl.
*B67D 7/06* (2010.01)
*B65D 35/56* (2006.01)
*B65D 81/02* (2006.01)
*B65D 25/14* (2006.01)

(52) U.S. Cl. ............. 222/105; 222/143; 222/185.1; 206/511; 206/509; 220/495.05; 220/630

(58) Field of Classification Search ............... 222/185.1, 222/105, 146.6, 183, 501, 173, 504, 507, 222/509, 143; 206/503, 509, 508, 511, 512; 220/495.01, 495.03, 495.05, 628, 630, 636
See application file for complete search history.

(56) References Cited

U.S. PATENT DOCUMENTS

| | | | | |
|---|---|---|---|---|
| 1,998,586 A | * | 4/1935 | Maggenti | 222/91 |
| 3,239,104 A | * | 3/1966 | Scholle | 222/81 |
| 3,243,084 A | * | 3/1966 | Stegner | 222/95 |
| 4,165,024 A | * | 8/1979 | Oswalt et al. | 222/105 |

(Continued)

FOREIGN PATENT DOCUMENTS
DE    19839841 A1    3/2000
(Continued)

*Primary Examiner* — Kevin P Shaver
*Assistant Examiner* — Stephanie E Williams
(74) *Attorney, Agent, or Firm* — Lackenbach Siegel, LLP; Andrew F. Young

(57) ABSTRACT

The present invention is a reusable assembly for containing, distributing and consuming mineral water. The assembly includes a container having a top mounted handle and recesses and projections to facilitate piling. The lower portion has recesses and projections that match the upper recesses and projections when piled up among several units. The container has a partial cutout with a contoured opening so that a vane-like inner part can be placed thereupon. A bag is placed inside the container, on the vane, and has a nozzle that can fit an opening in the front wall of the container. The nozzle has a tubular configuration, allowing a plug to tightly fit inside. The assembly has a tap with a free end having side windows to let the water in. The plug and the head can be coupled to each other when the tap is inserted into the nozzle.

10 Claims, 15 Drawing Sheets

U.S. PATENT DOCUMENTS

| | | | | |
|---|---|---|---|---|
| 4,318,497 A | * | 3/1982 | Friedrich | 222/83 |
| 4,421,253 A | * | 12/1983 | Croley | 222/105 |
| 4,516,692 A | * | 5/1985 | Croley | 222/105 |
| 4,585,143 A | * | 4/1986 | Fremow et al. | 206/386 |
| 5,115,943 A | * | 5/1992 | Coleman | 222/94 |
| 5,356,029 A | * | 10/1994 | Hogan | 229/117.3 |
| 6,772,912 B1 | | 8/2004 | Schall et al. | |

FOREIGN PATENT DOCUMENTS

| | | |
|---|---|---|
| EP | 0640533 A | 3/1995 |

* cited by examiner

CORTE A-A

REUSABLE ASSEMBLY FOR CONTAINING, DISTRIBUTING AND CONSUMING MINERAL WATER

CROSS-REFERENCE TO PRIOR APPLICATION

This is a U.S. National Phase application under 35 U.S.C. §371 of International Application No. PCT/BR2005/000242, filed Nov. 25, 2005 which claims the benefit of Brazilian Patent Application No. PI0405365-6, filed Nov. 29, 2004, both of which are incorporated by reference herein. The International Application was published in English on Jun. 1, 2006 as WO 2006/056034 A2 under PCT Article 21(2).

DISCLOSURE OF THE INVENTION

1. Field of the Invention

More particularly, the present invention is directed to a portable container and the respective support base. The container is in the form of a return package, but having a plastic bag inside same that, besides being disposable, is provided with a valve to be coupled to a lower point on the front wall of said container, where it can receive a non-disposable tap, through which the water flows gradually. Said tap is fit in a peculiar way, since said valve is provided with an inner plug designed to satisfy several operating conditions, the first of which is to provide a tight closure of said bag after the same has been supplied with a certain amount of mineral water, and the second is to provide a means so that said plug is removed by the tap itself when it is fit into the valve, that is, when it is inserted into said valve, thus coupling same to said plug, attaching the latter to the corresponding end of the tap and, at the same time, it is removed from the valve, thus allowing the water contained inside the bag to flow freely through said tap when the latter is opened.

2. State of the Art

As is known by those skilled in the art, currently one of the most used systems for containing, distributing and consuming mineral water is the one that uses return demijohns.

Of course this way the mineral water is distributed is quite practical and relatively cost-effective, however, it has already been proven that this system does not satisfy all the rules that regulate this type of product, for it suffers a number of disadvantages, some of which compromise this system quite a bit, the first one being the difficulty in cleaning same, not only due to the shape of the demijohn itself, but also for the fact that it is not disposable, and thus it requires repeated washing operations, what is really very difficult, since chemical products and especial equipment are required for such purpose and even so the cleaning process is not performed satisfactorily. The second disadvantage is that the water cannot be suitably preserved while it is kept for consumption in the drinking fountain, since this system only functions if the air intake is the same as the water that leaves same, consequently, the air that goes inside the demijohn is usually full of bacteria and other impurities and, along with the water, generate an ideal environment for the proliferation of said bacteria. Another significant disadvantage is the fact that the demijohns do not have a shape so that they can be handled easily, what it makes it really difficult to handle and carry same.

The state of the art also presents a number of proposals for solving the problems above and others are referred to, for example, the teachings found in documents M.U. No. 8.203.294-7, M.U. No. 8.203.295-5 and M.U. No. 8.203.308-0.

Generally, such documents show a different water storage method, however, keeping the same functional concept of the traditional demijohns, that is, a plastic bag is inserted into said demijohn, and a nozzle that matches that of the demijohn is provided. Of course a number of other details is foreseen so that this way of containing mineral water can take place inside the plastic bag, after it has been previously placed inside the demijohn, which is ultimately closed by a cap that can be punctured by a pointed tip provided in the drinking fountain. Thus, when the demijohn is placed onto the drinking fountain, its cap is punctured automatically, allowing the water to flow toward the drinking fountain tap. Of course, in this case the demijohn has a hole to let the air in, however, the air does not contact the water, but only serves to prevent plastic bag from "deflating" gradually at the same ratio the water is consumed. After the demijohn is emptied, it is returned to be filled up, but the bag is discarded.

Of course this solution has brought about important improvements in the sector, notably regarding the use of the demijohns, however, it was noticed that the industrial process is really complex and even so the traditional demijohns are kept, the cleaning of which must be carried out even when the water does not contact its interior and, still, the shape of the demijohn still is an upset for handling same, since it is not provided with handles or other means so that it can be handled easily, thus requiring the use of both hands, either for carrying same or for placing same onto the drinking fountain.

On the other hand, the state of the art also offers a few technical teachings for drinking fountains especially designed to eliminate the use of demijohns Among such teachings, documents M.U. 8.202.856-7 and M.U. 8.300.154-9 may be cited, and both have practically the same operating concept, that is, a box-like structural body is provided, in such a way that a very thin bag or a fine plastic film bag can be placed inside same. Said bag receives a certain amount of mineral water and is kept in this condition inside the box, however, its wall can be punctured easily in two different ways, the first of which is by means of a pointed pipe that, on the one hand, is placed vertically inside said box until the bag is inserted therein and then its wall is punctured and perforated by said tip while, on the other hand, said pointed pipe is interconnected with a tap, in such a way that the water can flow until toward same to be dispensed. The second way is similar to the first one, however, the whole perforation is carried out along with a tap and, for such purpose, said bag includes a nozzle attached to the front portion of the box. Said nozzle, besides a sealing, includes a hole having an inner plug, which can be punctured by the back end of the tap when it is inserted into the bag nozzle, thus allowing the water to exit through said tap.

It is quite clear that the teachings found in the documents above provide a technological improvement regarding the containment, distribution and consumption of mineral water, however, a few disadvantages have been pointed in the use of the assembly, some of which are related to the manufacture of the components, for, in both cases several sealing components are required, where especial care and precision in the manufacture of the parts have not been enough to prevent leaks. Another inconvenience is the large number of parts and the way they are assembled that, combined with the box-like structural part, have contributed to the difficulty in conforming the bag and, still, this industrial complexity also has turned the use of the assembly substantially more complex for the final consumer.

OBJECTS OF THE INVENTION

In view of the circumstances above and aiming at overcoming same, the present invention was made, thus introducing several technical and functional improvements, not only aiming at making it easier for the consumer to use the assembly, but also aiming at reducing the number of parts and including a more efficient sealing system, that is, in the beginning the assembly is comprised of two structural basic parts, one defined as a base and the other as the container, wherein the latter, besides having an upper handle and inserts for piling up among several units, is also provided with a large opening in the bottom thereof, however, another inner part in the shape of a small support vane for a disposable bag made of a transparent plastic film lies on the bottom thereof, to be filled with a certain amount of mineral water, and said plastic bag also is provided with a nozzle that, together with a nut, is attached to the front wall of the container, said nozzle including a tubular-shaped inner plug especially designed to close tightly said nozzle and, at the same time, said plug is provided with means to be displaced inward to open or close the nozzle through the tap itself or dispensing nozzle, that is, in a first manufacturing condition said plug is kept fit inside the nozzle, keeping same tightly closed. The thus assembled nozzle is hot welded to the plastic bag that is then placed inside the container, in such a way that said nozzle can be attached to the front wall thereof, thus completing the assemblage of the assembly and preparing same for the containment, which takes place by using a tip that, in its turn, is inserted into the related nozzle and then the plug is coupled to the inner tip of the dispensing nozzle, the latter being inserted sufficiently to fully remove the plug from the plastic bag nozzle, however, the tip of the dispensing nozzle and the plug retained therein are positioned inside the plastic bag and, in such position, the filling operation is started and, once completed, allows said nozzle to be pulled outward again, and then the plug is returned to its original position, since, when it reaches the interior of the nozzle, it is locked again and released from the dispensing nozzle, tightly closing said plastic bag nozzle, thus finishing the filling operation, however, in order to guarantee the origin of the product, a sealing is applied to said nozzle and then the container can be transferred to the distributor and from there to the final consumer.

For the final consumer said plug operates exactly in the same way, but then a especially designed tap is provided, that is, the body and the tap have usual characteristics but the back portion thereof is provided with a cylindrical tip to fit tightly into said plastic nozzle bag, only after the safety seal has been removed. Said tip has a peculiar geometry since, when it goes inside the nozzle it also goes inside the plug, making same to couple the tip of said tap, and then the plug is pulled inside the bag away from the nozzle and, after the tap is duly fit therein and grasp the plug, the tubular body of the tap is provided with side windows for the passage of water and, then, when said tap is opened, the water flows normally and can be consumed gradually, without the reflux of air inside the plastic bag, since this is not required to release the water, and the bag simply deflates at the same ratio as the water leaves same.

Once all the water has been consumed, the user simply removes the tap, so that plug returns to its original position and then the whole assembly is sent back to be refilled, but in this in case the empty bag is removed and discarded to be recycled in a plastic reutilization process, and another full bag having the same features replaces same.

Of course the assembly in question has been developed to fulfill different objects, either related to manufacturing aspects or distribution and consumption aspects, thus providing different practical technical benefits among which the following can be cited:

a) all the components are manufactured in accordance with national and international quality standards, mainly with respect to hygiene, so that the bag, already in the manufacturing process, is kept hermetically closed and can be handled without any risk of contamination;

b) only two parts are assembled in the container, the bag and the nut for attaching its nozzle, consequently speeding up the industrial process for producing the assembly;

c) the filling does not change the final assembly, that is, it does not require extra parts except for the safety seal, thus reducing the final cost of the assembly considerably;

d) the parallelepipedical shape of the container and its handle, as well as its piling configuration, concur to speed up the transportation, conveyance and storage of the units;

e) only one part, the container itself, must be returned, while the base and the tap are kept by the final consumer;

f) the disposable part, that is, the plastic bag, is automatically returned to the filling site, where it is possible to concentrate all the disposable parts to be recycled, and thus there are no residual parts that would have to be collected eventually;

g) the bag allows the mineral water to exit the tap as desired, without any air, so the water remaining in the bag is always preserved without losing its original characteristics;

h) all the parts are standardized and autonomous and can easily be replaced in the event of any damage;

i) the plug system provided with a fit from the inside confers a tight effect, since the inner pressure of the bag acts for the purpose of closing said plug, so the possibility of leak is impossible while the container is conveyed, even when said one container is not handled with care; and j) the ergonomics of the assembly is optimum, since the use thereof is simple, that is, it is enough to place the container on its base and insert the tap that, in its turn, seals the nozzle outlet besides removing the plug and the water flows inside said tap only when it is used.

DESCRIPTION OF THE DRAWINGS

For a better understanding of the present invention, a detailed description of the same is given below, with reference to the attached drawings, wherein.

Figure 2:
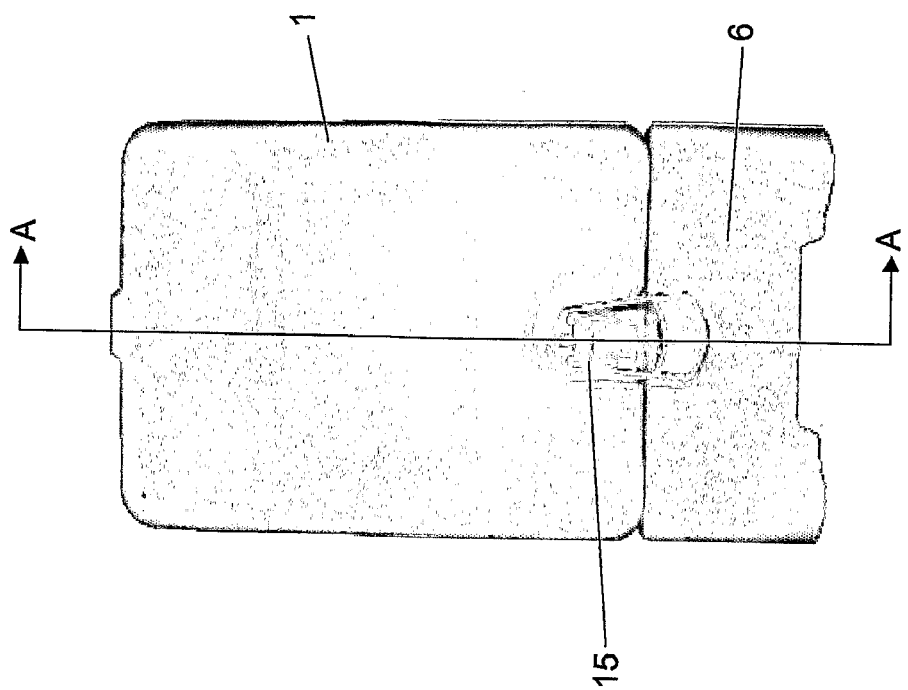
FIG. 2 shows one another front view of the assembly.
Figure 1:
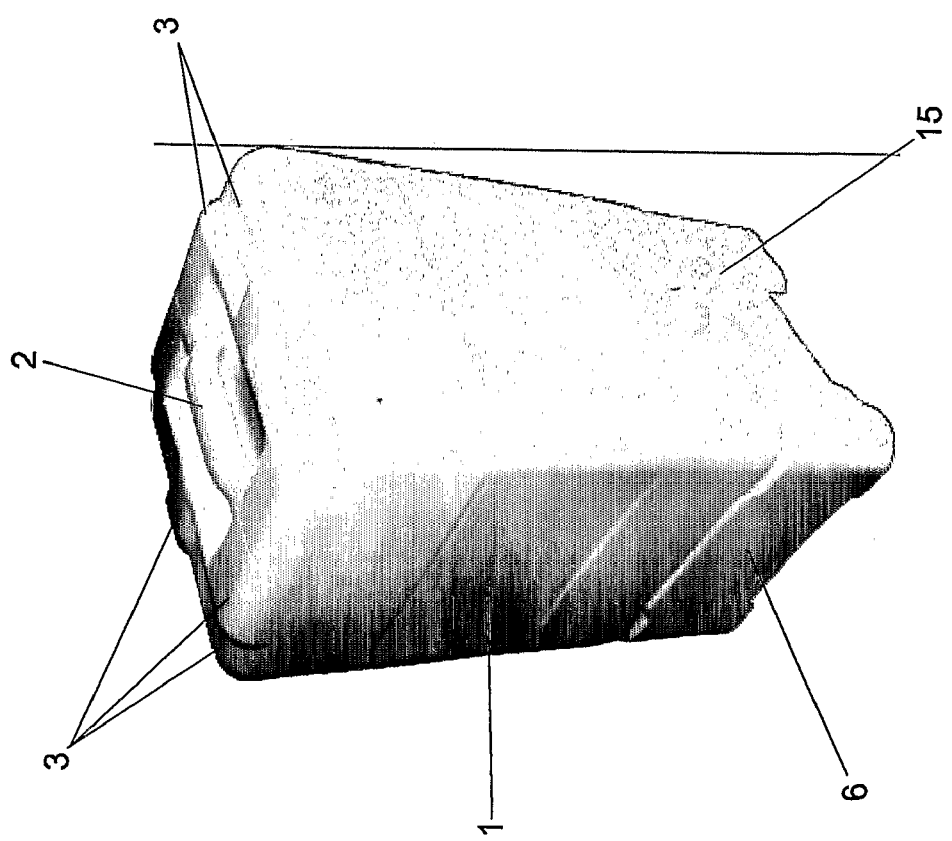
FIG. 1 represents a front top perspective view of the assembly.
Figure 3:
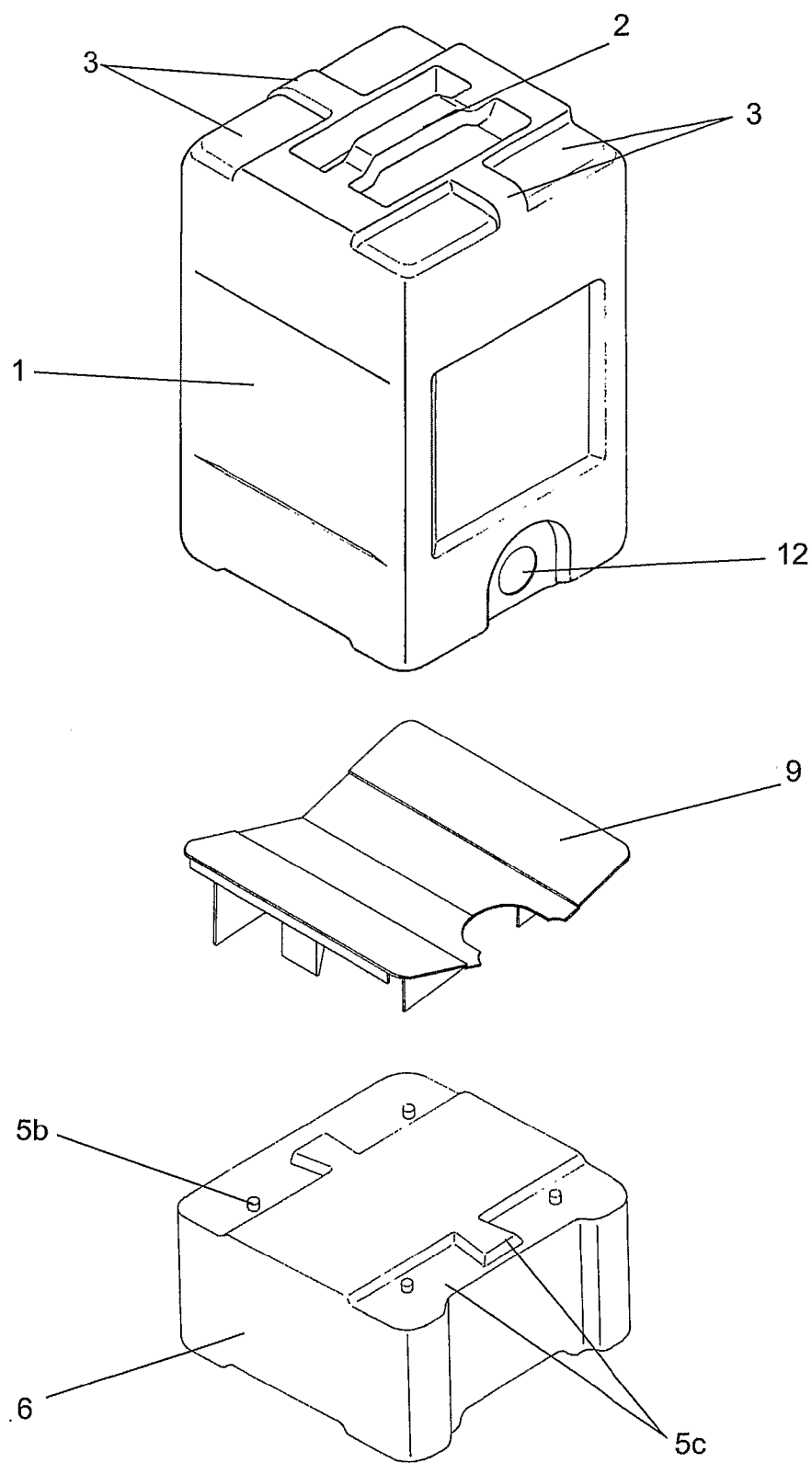
FIG. 3 illustrates an exploded perspective bottom view depicting the container, vane and support base.
Figure 4:
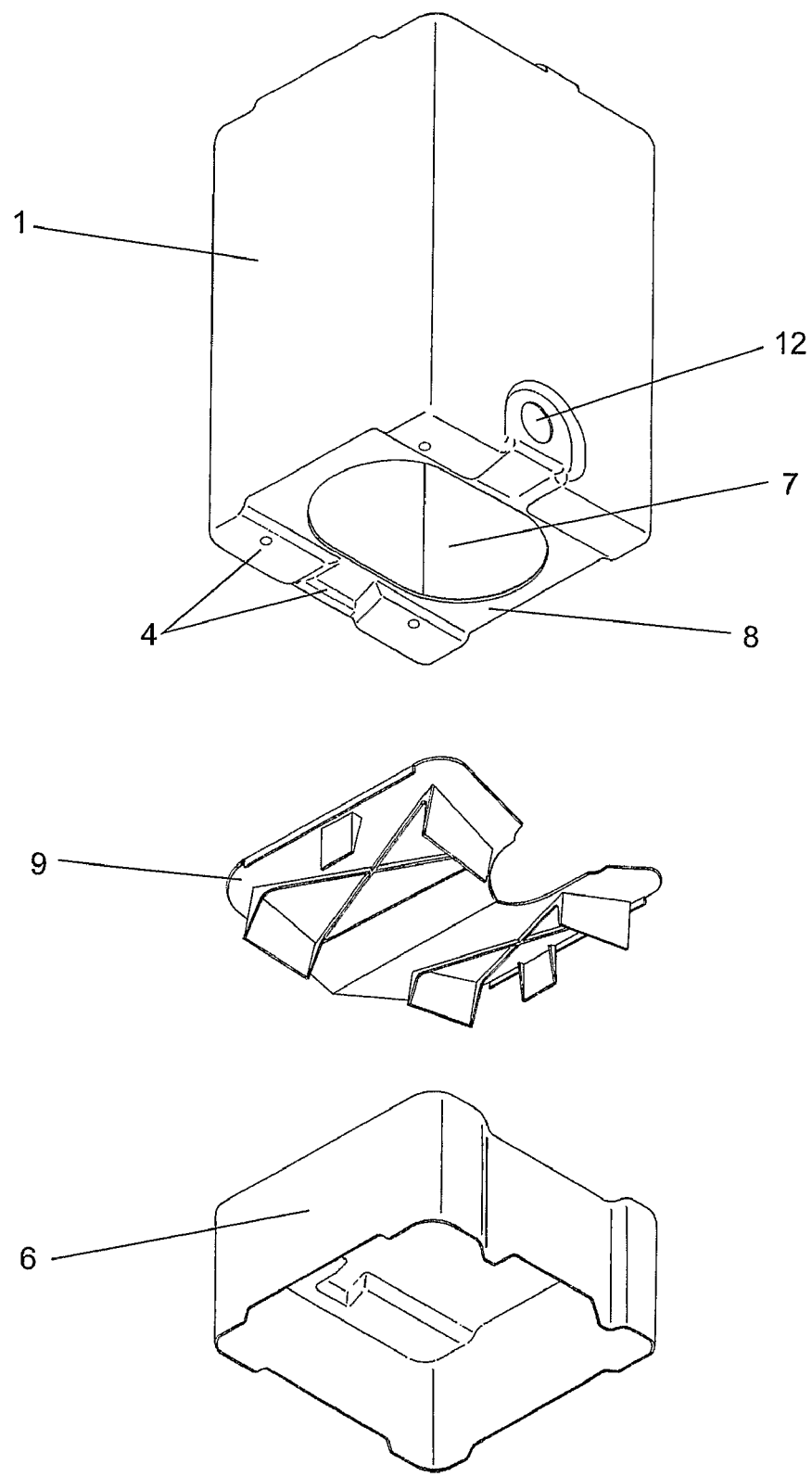
FIG. 4 illustrates another exploded perspective view depicting the container, vane and support base, however, seen from below.
Figure 5:
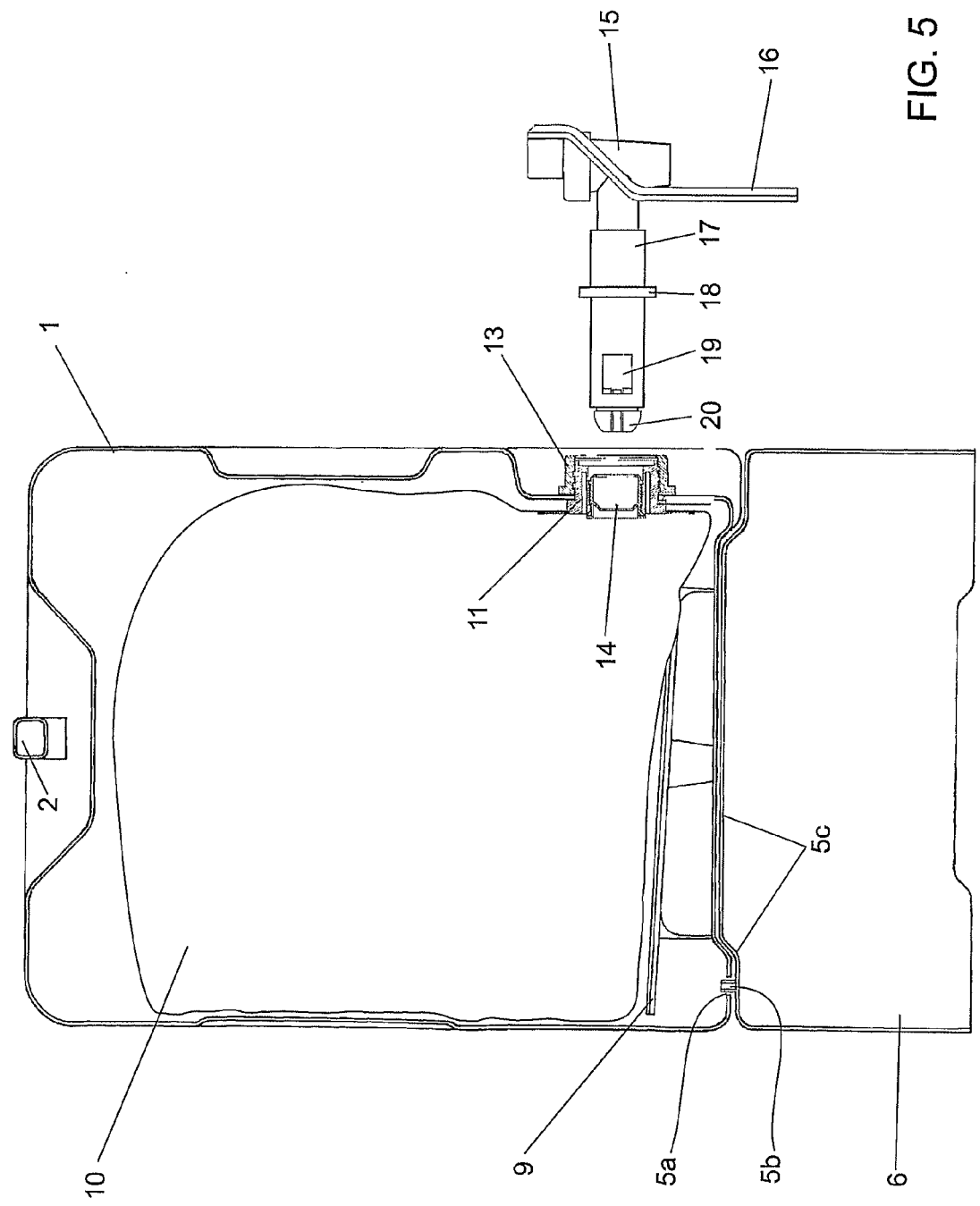
FIG. 5 shows a cut side view of the fully assembled assembly, but in this in case the tap has not been inserted in the mineral water outlet nozzle.
Figure 6:
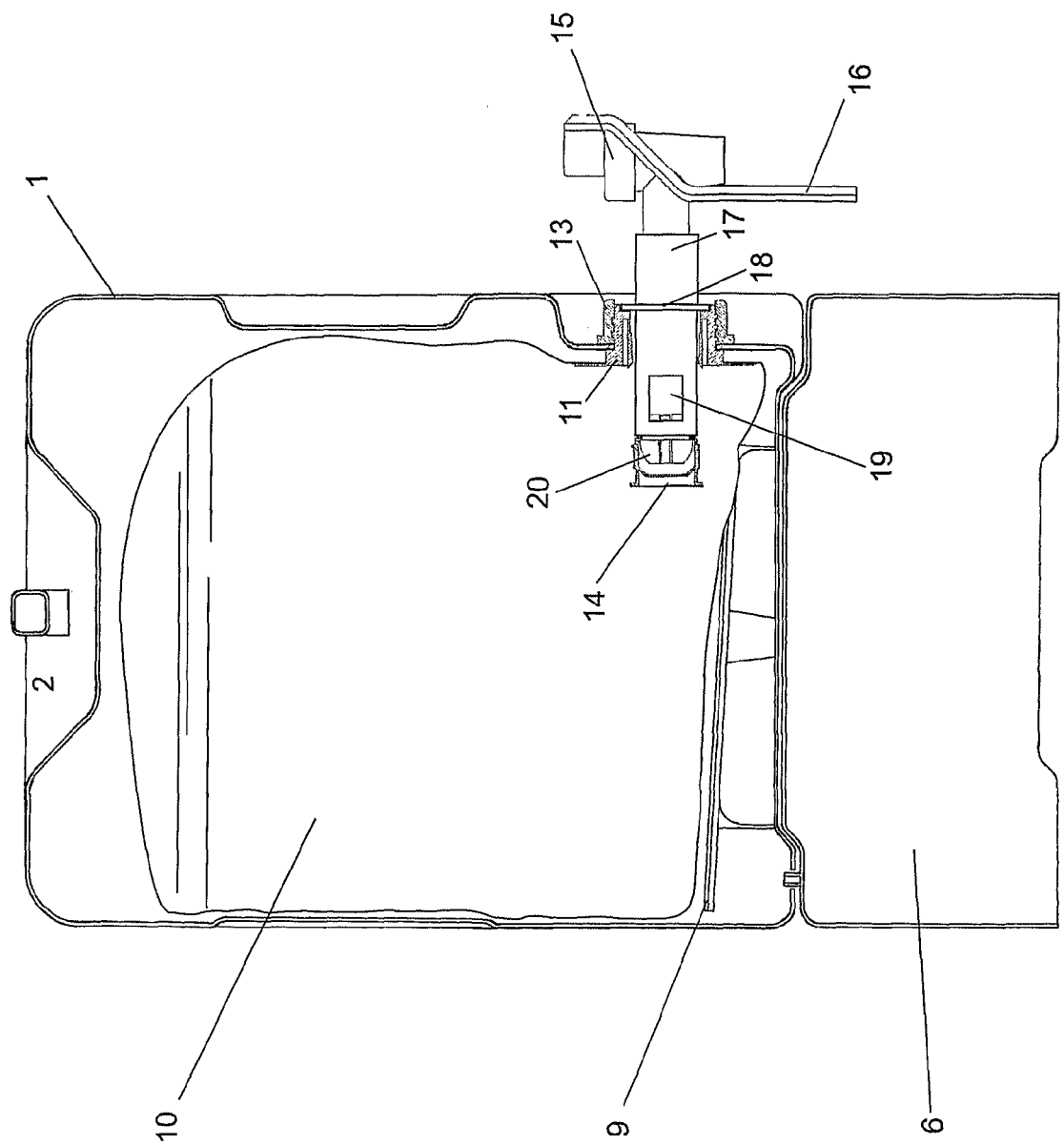
FIG. 6 shows a view similar to the previous one, but in this case the tap has been inserted inside the nozzle.

According to these illustrations and the details therein, more particularly FIGS. 1 through 4, the present invention, a reusable assembly for containing, distributing and consuming mineral water, is characterized by comprising:

a) preferably a parallelepipedical container (1), provided on its top with a handle in the shape of a center tubular handle (2) and piling means in the shape of recesses and projections (3), being also provided in the lower part with piling means in the shape of recesses and projections (4) that match the upper recesses and projections (3) when it is piled up among several units, the bottom of which is provided with other means such as fitting and locking holes (5a) for bolts (5b) disposed on the upper face of a support base (6) also is parallelepiped-shaped and has upper elements (5c) in the shape of recesses and projections for seating the bottom of the container (1);

b) said container having a cutout bottom to create a large opening (7), but a part (8) of said bottom is kept to contour said opening (7), in such a way that a vane-like inner part (9) can be placed on said part (8);

c) as shown in FIG. 5, a plastic bag (10) is placed inside the container (1) and on the vane (9), which bag is provided with a cylindrical nozzle (11) that can fit the opening (12) from inside in the lower portion of the front wall of the container (1), and said nozzle (11) is attached by a nut (13);

d) the nozzle (11) has a tubular configuration, so that a plug (14) can be tightly fit inside same;

e) a tap (15) with its respective actuating knob (16), having a back tubular part (17) with a mid flange (18) and free end having side windows (19) to let the water in, and said end has an axially aligned end head (20);

f) as shown in FIG. 6, the plug (14) and the head (20) can be coupled to each other when said tap (15) is inserted into the nozzle (11);

g) said tap (15) with the tubular element placed between the flange (18) and the head (20) has a length enough to go across the nozzle (11) and expose the windows (19) inside the bag (10), in such a way that the water can flow toward the tap (15) to be served when its actuating knob (16) is operated; and h) said plug (14) is also provided with external means to be kept again inside the nozzle (11) thus keeping same tightly closed when said tap (15) is pulled outside and fully removed.

Figure 7:
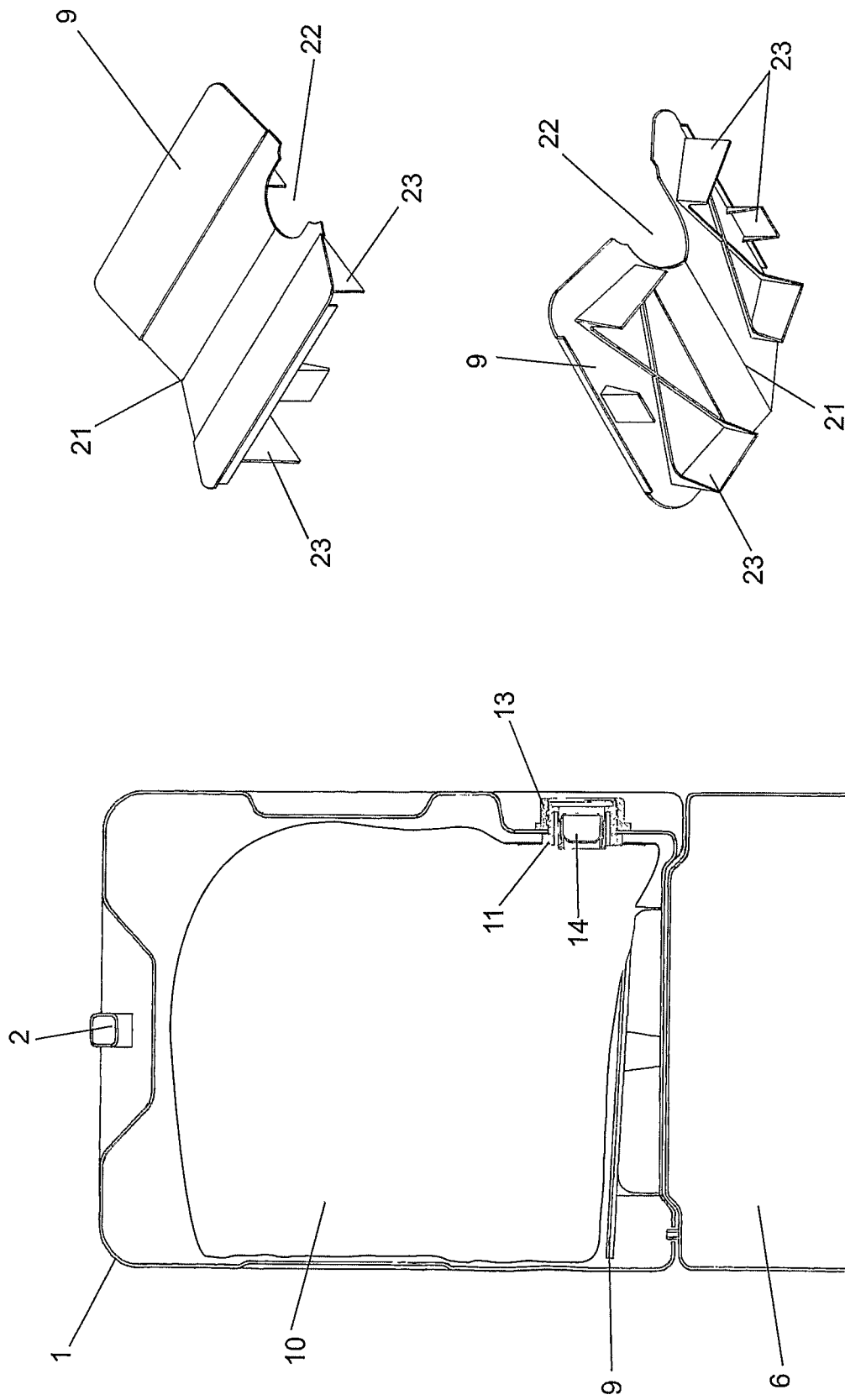
FIG. 7 is a side perspective view focusing the support vane of the disposable mineral water bag.

As illustrated in FIG. 7, the vane-like inner part (9) is comprised of a platform in two inclined plans toward a longitudinal rib (21) that constitutes the lower part of said platform, the front portion of which has a semicircular recess (22), and feet-like shoulders (23) are also provided in the lower part, the front shoulders being shorter so that the vane is slanted, thus creating a cooperating channel so that the water contained inside the bag (10) can flow toward the nozzle (11).

Figure 8:
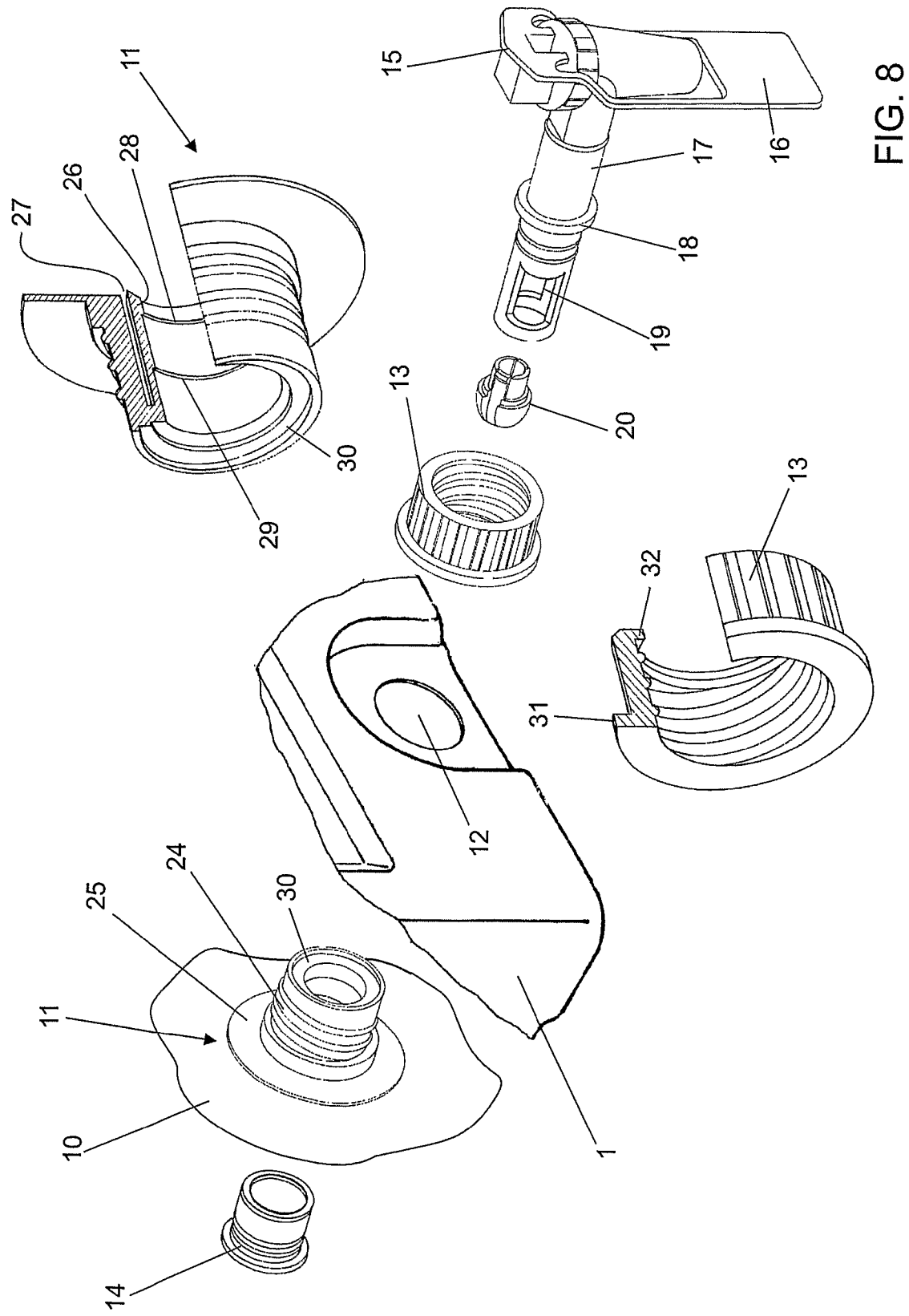
FIGS. 8 through 11 are exploded perspective views depicting the construction of the parts that configure the assembly.

As illustrated in FIG. 8, the tubular nozzle (11) has a cooperating external thread (24) for coupling the nut (13) that attaches said nozzle to the hole (12) of the front wall of the container (1), and the back end of said nozzle (11) is also provided with a substantially thin flange (25) on which one of the walls of the bag is hot welded (10), while the inner diameter of such nozzle is provided with a cylindrical bushing (26) from a cylindrical concentric channel (27), the inner part of said bushing being defined by at least two diameters, thus forming two seating steps (28-29) and slightly locking the plug (14), and a recess (30) for seating the flange (18) of the tap (15) is provided in the front end of said nozzle (11).

Still with regard to FIG. 8, one end of the nut (13) has an external flange (31), while the other end has an internal flange (32), the former acting against the front wall of the container (1), and the latter fitting and finishing the flange (18) of the tap (15).

Figure 9:
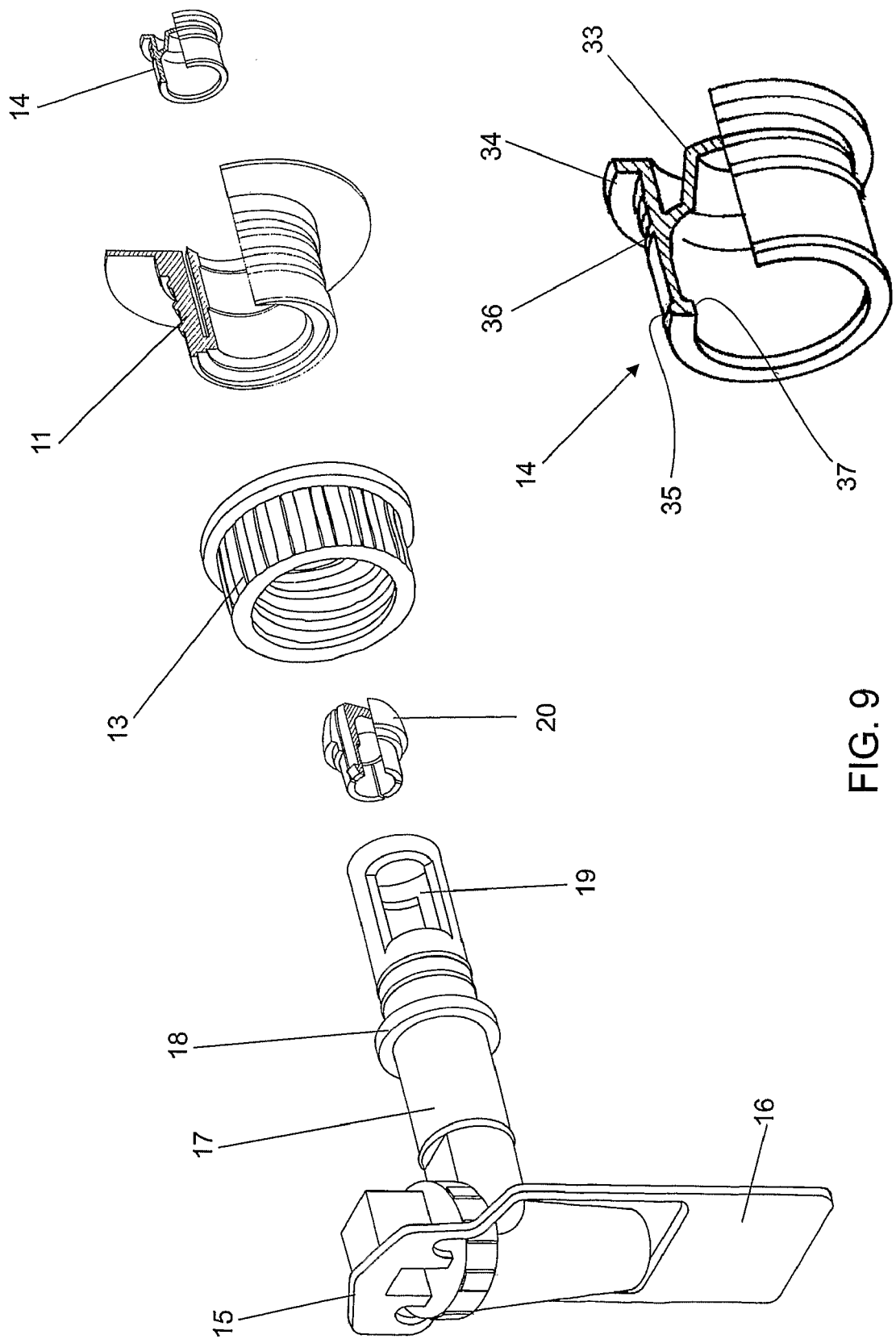

With respect to FIG. 9, the plug (14) is a tubular part having its back end fully closed by a hub-like wall (33) and, in this same end, an external flange (34) is provided for limiting its penetration inside the nozzle (11), while on the other end its external diameter has a thin ring-shaped protuberance (35) that, together with other similar protuberances (36), act as claws and sealing means when coupled to the steps (28-29) of the nozzle (11), and a cooperating grasping edge (37) to be coupled to the head (20) of the tap (15) is disposed in the internal diameter and front end of the plug (14).

Figure 10:
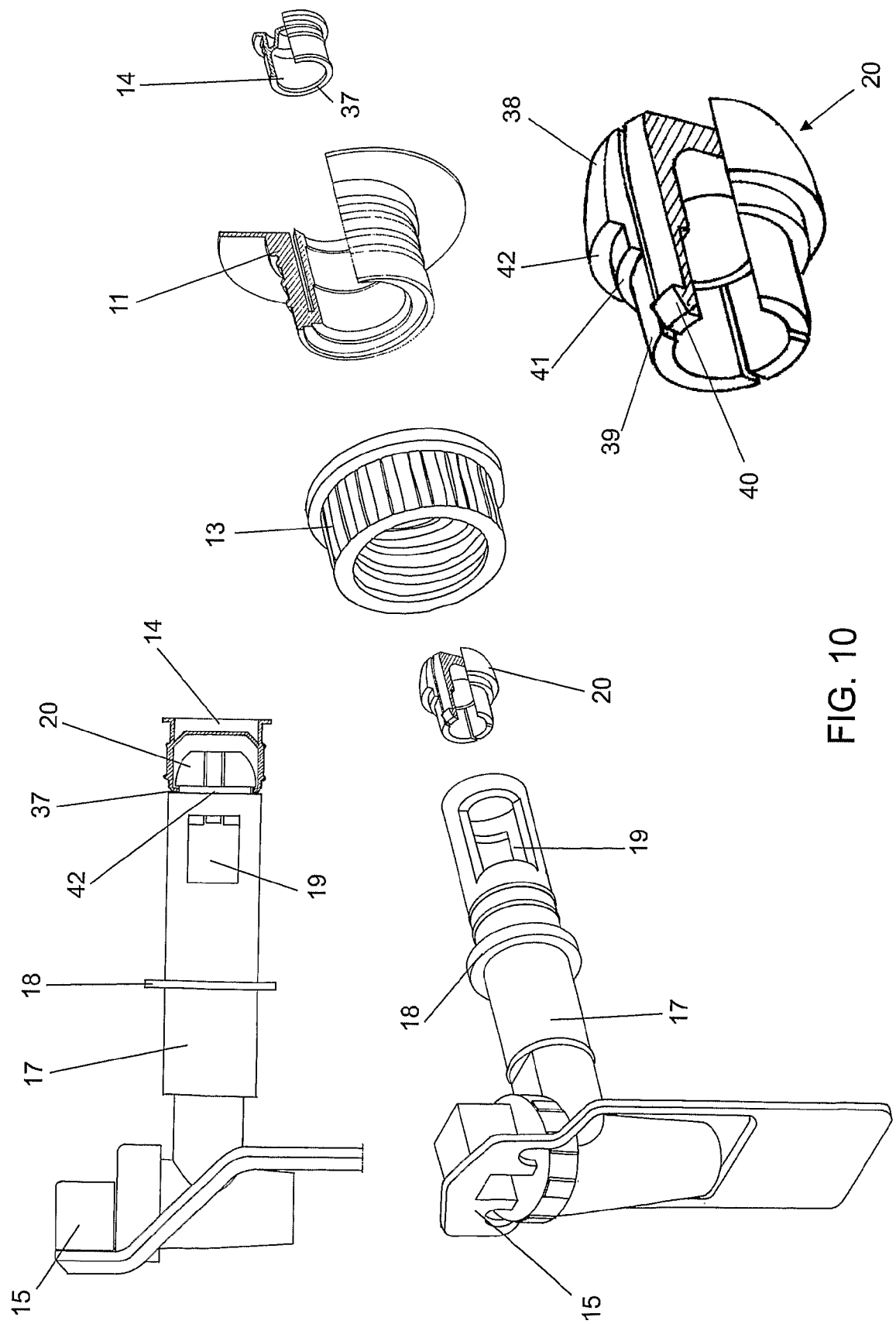
Figure 11:
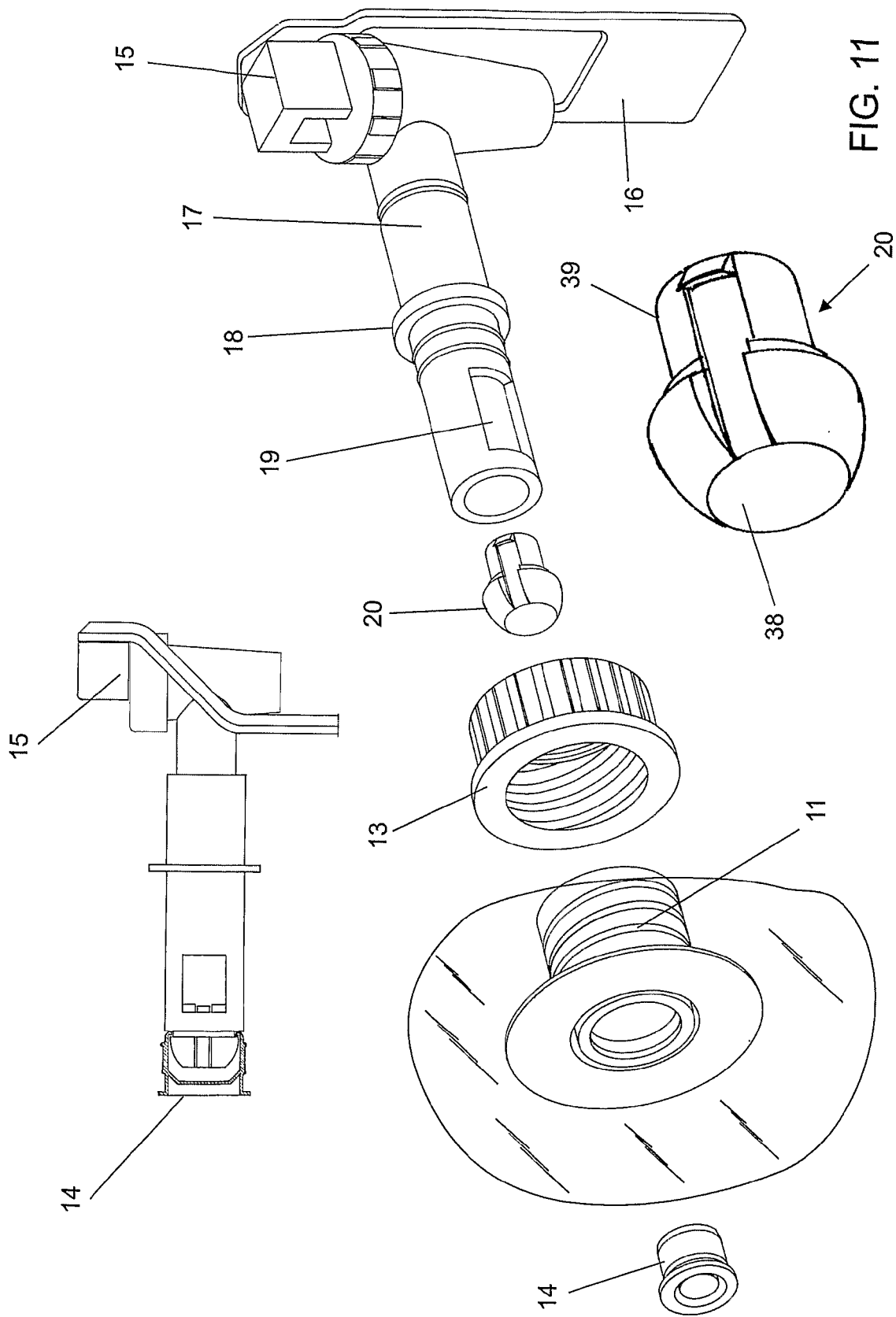

With relation to FIGS. 10 and 11, the head (20) has an almost spheroid end (38) fully closed on one side, while the other side has a cooperating axial tubular prolongation (39) to fit inside the tubular body (17) of the tap (15), said tubular part (39) including slits preferably like two cooperating diametrically opposed claws (40), for locking this part to the side windows (19) of the tap (15), and said head (20) has a step-like resting sector (41) of a lesser diameter between the spheroid part (38) and the tubular part (39), in order to form a ring-shaped cooperating channel (42) for fitting and slightly locking the plug (14) through its inner edge (37).

Figure 12:
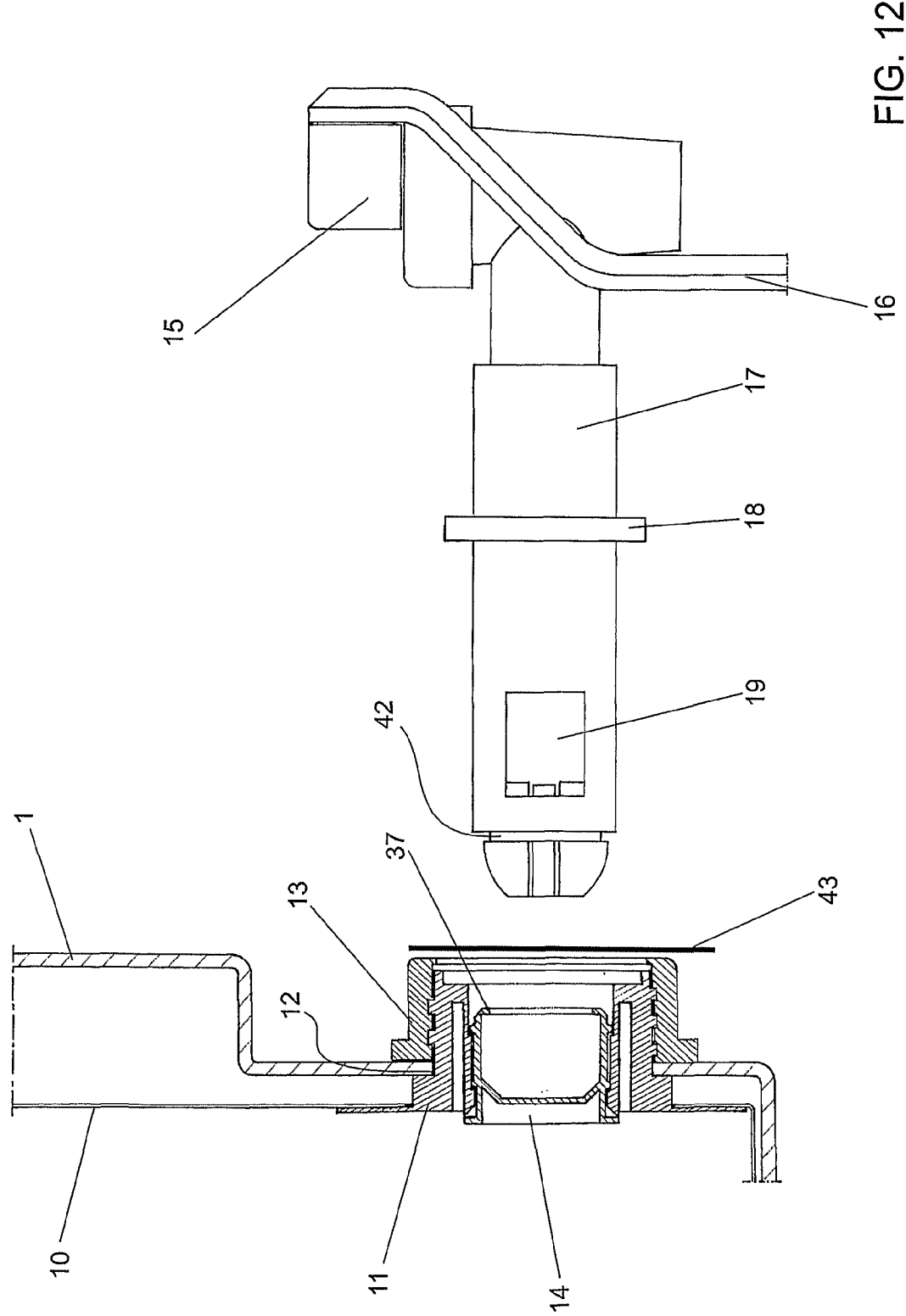
FIGS. 12 and 13 show extended details and in cut, depicting the movement of the plug when the tap is fit into position.

With regard to FIG. 12, a characteristic of the assembly is that the plug (14) is inserted and locked inside the nozzle (11) before it is welded to the wall of the bag (1), and then this assembly or the nozzle (11) is inserted from inside into the hole (12) of the front wall of the container (1), wherein the attachment by the nut (13) is completed, and its front portion receives a seal (43), which is only applied after the bag (10) already placed inside the container (1) has been filled.

Figure 13:
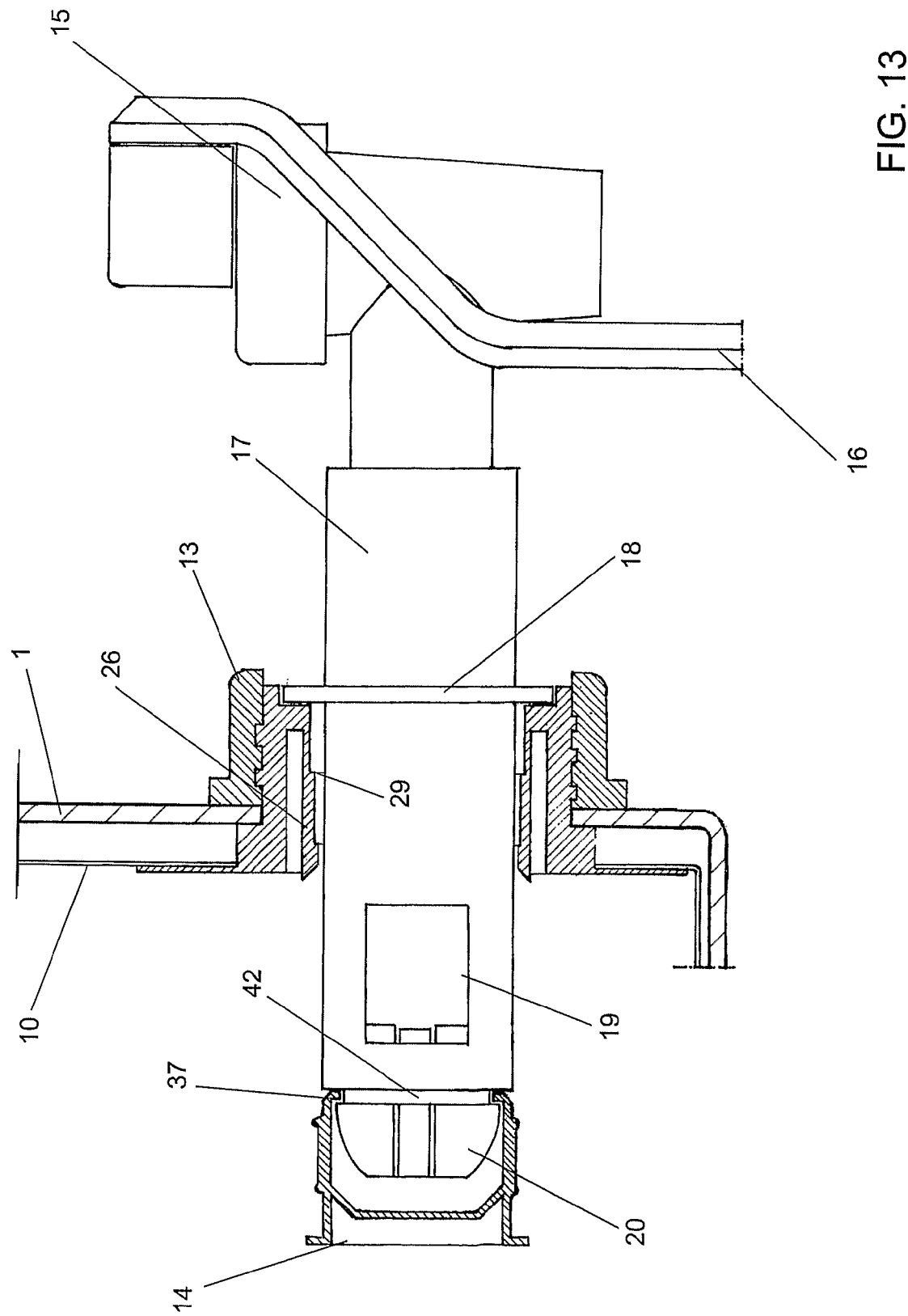

FIG. 13 illustrates the assembly in the position to be use by the final consumer and, in such condition the seal (43) has already been removed and violated, that is, in this figure the tap (15) has already been inserted into the nozzle (11), so it is evidenced that another feature of the assembly is that there is a coupling between the plug (14) and the head (20) of the tap (15), naturally when the tubular body (17) thereof was inserted into the sleeve (26) of the nozzle, where the penetration is limited by the flange (18) and, still, a sealing is performed by the claw effect of the steps (29), and said head (20) penetrates inside plug (14) in such a way that its inner edge (37) can be coupled by the ring-shaped channel (42) of said head (20) and, in this position, the assembly is pushed inside the bag (10) until the pair of windows (19) is inside said bag (10), thus allowing the water to flow inside the tubular body (17) and be dispensed through the tap (15).

Figure 14:
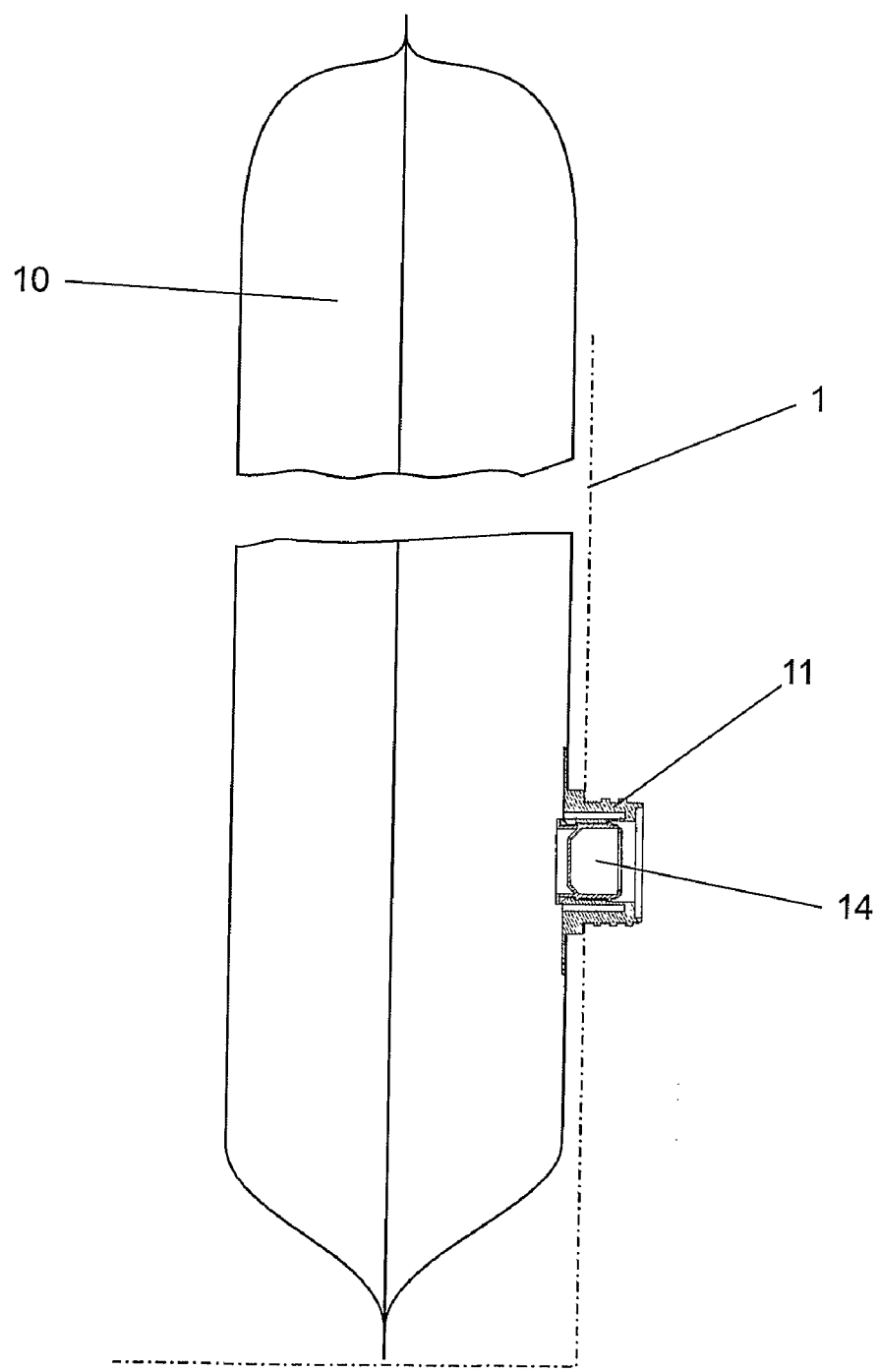
FIGS. 14 and 15 are complementary schematic views that show how the disposable bag is filled.
Figure 15:
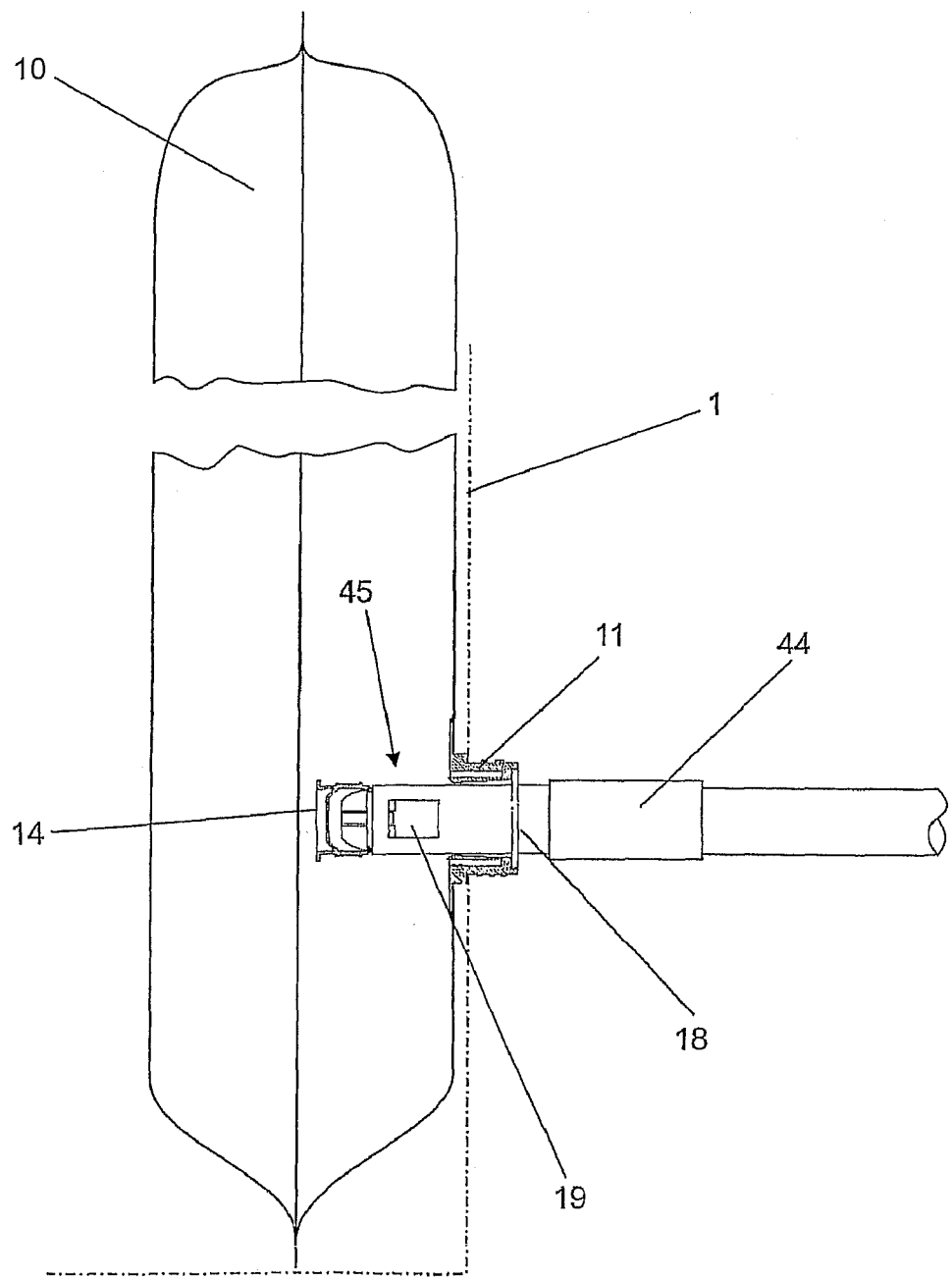

FIGS. 14 and 15 show schematically the operation of filling the bag (15), and in this exemplified illustration one feature of the assembly is the fact that the filling operation is performed by using a tip (44), whose penetrating end (45) has a geometry similar to that of the tap (15) from the flange (18). In this condition, said tip is inserted into the nozzle (11) carrying along the plug (14) and the bag (10) is then filled through the windows (19), and in the end the removal of the tip (44) places said plug inside the nozzle (11) again, tightly closing same, as already mentioned previously.

Figure 16:
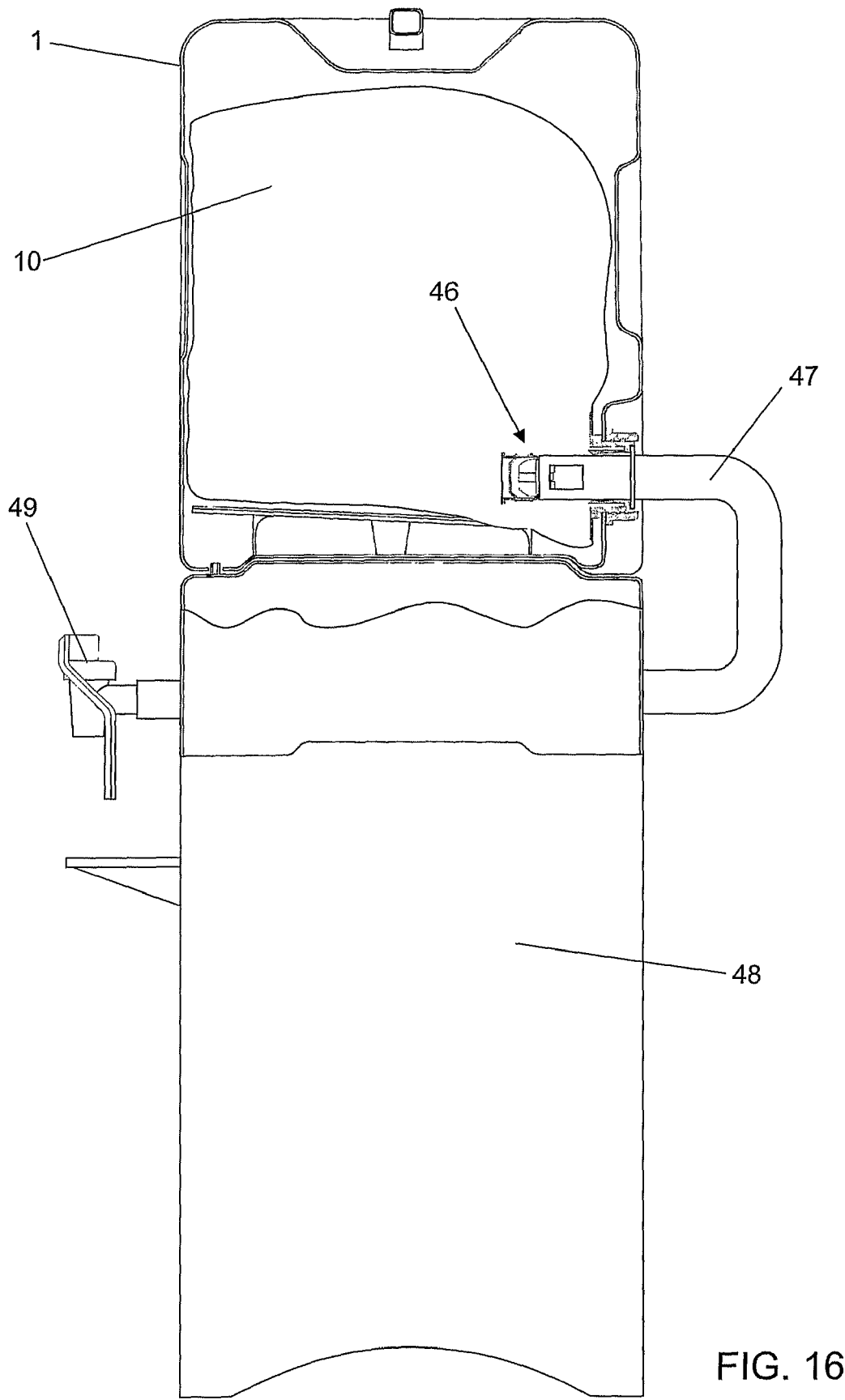
FIG. 16 shows a schematic view illustrating the use of the assembly in a water refrigeration apparatus.

In some situations, such as that illustrated schematically in FIG. 16, the mineral water contained in the bag (10) is not dispensed directly by the tap (15), but by a refrigeration device to serve the water at ambient temperature or lower temperatures, and in this case the feature of the assembly is fact that it includes a penetrating nozzle (46) having the same geometry as that of the tap (15) from its flange (18), and said penetrating nozzle (46) is coupled to a suitable pipe (47), the other end of which is connected to the usual refrigeration device (48) having the respective taps (49) for cold water and ambient temperature water.

The invention claimed is:

1. A reusable assembly for containing, distributing and consuming mineral water, said reusable assembly comprising:

(a) a parallelepipedical container, provided on its top with a handle in the shape of a center tubular handle and piling means in the shape of recesses and projections, being also provided in the lower part with piling means in the shape of recesses and projections that match the upper recesses and projections when it is piled up among several units, the bottom of which is provided with other means such as fitting and locking holes for bolts disposed on the upper face of a support base also is parallelepiped-shaped and has upper elements in the shape of recesses and projections for seating the bottom of the container;

(b) said container having a cutout bottom to create a large opening, but a part of said bottom is kept to contour said opening, in such a way that a vane-like inner part can be placed on said part;

(c) a plastic bag is placed inside the container and on the vane, which bag is provided with a cylindrical nozzle that can fit the opening from inside in the lower portion of the front wall of the container, and said nozzle is attached by a nut;

(d) the nozzle has a tubular configuration, so that a plug can be tightly fit inside same;

(e) a tap with its respective actuating knob, having a back tubular part with a mid flange and free end having side windows to let the water in, and said end has an axially aligned end head;

(f) the plug and the head can be coupled to each other when said tap is inserted into the nozzle;

(g) said tap with the tubular element placed between the flange and the head has a length enough to go across the nozzle and expose the windows inside the bag, in such a way that the water can flow toward the tap to be served when its actuating knob is operated; and (h) said plug is also provided with external means to be kept again inside the nozzle thus keeping same tightly closed when said tap is pulled outside and fully removed.

2. The reusable assembly for containing, distributing and consuming mineral water according to claim 1, wherein the vane-like inner part is comprised of a platform in two inclined plans toward a longitudinal rib that constitutes the lower part of said platform, the front portion of which has a semicircular recess, and feet-like shoulders are also provided in the lower part, the front shoulders being shorter so that the vane is slanted, thus creating a cooperating channel so that the water contained inside the bag can flow toward the nozzle.

3. The reusable assembly for containing, distributing and consuming mineral water according to claim 1, wherein the tubular nozzle has a cooperating external thread for coupling the nut that attaches said nozzle to the hole of the front wall of the container, and the back end of said nozzle is also provided with a substantially thin flange on which one of the walls of the bag is hot welded, while the inner diameter of such nozzle is provided with a cylindrical bushing from a cylindrical concentric channel, the inner part of said bushing being defined by at least two diameters, thus forming two seating steps and slightly locking the plug, and a recess for seating the flange of the tap is provided in the front end of said nozzle.

4. The reusable assembly for containing, distributing and consuming mineral water according to claim 1, wherein the nut has an external flange, while the other end has an internal flange, the former acting against the front wall of the container, and the latter fitting and finishing the flange of the tap.

5. The reusable assembly for containing, distributing and consuming mineral water according to claim 1, wherein the plug is a tubular part having its back end fully closed by a hub-like wall and, in this same end, an external flange is provided for limiting its penetration inside the nozzle, while on the other end its external diameter has a thin ring-shaped protuberance that, together with other similar protuberances, act as claws and sealing means when coupled to the steps of the nozzle, and a cooperating grasping edge to be coupled to the head of the tap is disposed in the internal diameter and front end of the plug.

6. The reusable assembly for containing, distributing and consuming mineral water according to claim 1, wherein the head has an almost spheroid end fully closed on one side, while the other side has a cooperating axial tubular prolongation to fit inside the tubular body of the tap, said tubular part including slits preferably like two cooperating diametrically opposed claws, for locking this part to the side windows of the tap, and said head has a step-like resting sector of a lesser diameter between the spheroid part and the tubular part, in order to form a ring-shaped cooperating channel for fitting and slightly locking the plug through its inner edge.

7. The reusable assembly for containing, distributing and consuming mineral water according to claim 1, wherein the plug is inserted and locked inside the nozzle before it is welded to the wall of the bag, and then this assembly or the nozzle is inserted from inside into the hole of the front wall of the container, wherein the attachment by the nut is completed, and its front portion receives a seal, which is only applied after the bag already placed inside the container has been filled.

8. The reusable assembly for containing, distributing and consuming mineral water according to claim 1, wherein there is a coupling between the plug and the head of the tap, when the tubular body thereof was inserted into the sleeve of the nozzle, where the penetration is limited by the flange and is sufficient to locate the windows inside said bag.

9. The reusable assembly for containing, distributing and consuming mineral water according to claim 1, wherein the filling operation is performed by using a tip, whose penetrating end has a geometry similar to that of the tap from the flange in such a way that said tip is inserted into the nozzle carrying along the plug and the bag is then filled through the windows, and in the end the removal of the tip places said plug inside the nozzle again, tightly closing same.

10. The reusable assembly for containing, distributing and consuming mineral water according to claim 1, wherein in some situations the mineral water contained in the bag is not dispensed directly by the tap, but by a refrigeration device to serve the water at ambient temperature or lower temperatures, characterized by including a penetrating nozzle having the same geometry as that of the tap from its flange, and said penetrating nozzle is coupled to a suitable pipe, the other end of which is connected to the usual refrigeration device having the respective taps for cold water and ambient temperature water.

* * * * *